United States Patent [19]

Takii et al.

[11] Patent Number: 5,365,908
[45] Date of Patent: Nov. 22, 1994

[54] BURNING CONTROL SYSTEM FOR ENGINE

[75] Inventors: Osamu Takii; Motoshi Baba; Takao Mori; Sumito Abe, all of Iwata, Japan

[73] Assignee: Yamaha Hatsudoki Kabushiki Kaisha, Iwata, Japan

[21] Appl. No.: 961,456

[22] Filed: Oct. 15, 1992

[30] Foreign Application Priority Data

Oct. 15, 1991 [JP] Japan .................................. 3-295189
Jan. 24, 1992 [JP] Japan .................................. 4-34080

[51] Int. Cl.$^5$ ........................ F02B 33/34; F02D 23/00
[52] U.S. Cl. .................................. 123/564; 123/559.1; 123/561
[58] Field of Search ...................... 60/601, 602, 605.1; 123/430, 435, 559.1, 561, 564

[56] References Cited

U.S. PATENT DOCUMENTS

| | | | |
|---|---|---|---|
| 4,243,009 | 1/1981 | Staerzl | 123/435 |
| 4,646,522 | 3/1987 | Mamiya et al. | 60/602 |
| 4,873,961 | 10/1989 | Tanaka | 60/601 |
| 5,117,799 | 6/1992 | Suzuki et al. | 123/561 |
| 5,125,235 | 6/1992 | Yanagihara et al. | 60/605.1 |
| 5,211,147 | 5/1993 | Ward | 123/430 |

FOREIGN PATENT DOCUMENTS 2-267323 11/1990 Japan .
3-23314 1/1991 Japan .

*Primary Examiner*—Michael Koczo
*Attorney, Agent, or Firm*—Knobbe, Martens, Olson & Bear

[57] ABSTRACT

An internal combustion engine and method for operating the engine wherein a leaner than stoichiometric air/fuel ratio is maintained under all running conditions. The desired torque curve is obtained by increasing the amount of boost generated to the intake air charge without enrichening the air/fuel mixture. In addition, an anti-knocking system is incorporated that avoids knocking by retarding the spark advance and, at the same time, providing a leaning in the air/fuel mixture.

21 Claims, 7 Drawing Sheets

BURNING CONTROL SYSTEM FOR ENGINE

BACKGROUND OF THE INVENTION

This invention relates to a burning control system for an engine and more particularly to an improved internal combustion engine construction and method of operating such an engine.

Various engine constructions and engine operating methods have been proposed to improve fuel economy and exhaust gas emission control. One of the ways in which these goals have been sought, is through the use of a so called "lean burn" type of engine and engine operation. With such arrangements, the combustion chamber is provided with a mixture that is leaner than stoichiometric and some method is employed for insuring that there will be a stoichiometric mixture present at the spark plug at the time of firing. This can be accomplished through the use of various methods for increasing turbulence and/or directing the charge in the combustion chamber toward the spark plug at the time immediately prior to firing of the spark plug.

Although these arrangements have been quite effective in reducing fuel consumption and improving exhaust emission control, they are basically effective only under steady state running conditions. Most internal combustion engines, particularly those employed for automotive or vehicular applications, however, do not run at steady state conditions. When accelerating and/or operating at high load conditions, the conventional lean burn engines do not provide good performance. In order to offset this deficiency, it is the normal practice to run the lean burn engine at a stoichiometric or even richer condition under acceleration or at maximum load. Although this improves the running of the engine, it deteriorates both fuel economy and exhaust emission control.

It is, therefore, a principal object to this invention to provide an improved internal combustion engine and method of operating it which will permit operation under lean burn (less than stoichiometric) conditions under substantially all running conditions of the engine.

It is a further object to this invention to provide an improved engine and method of operating it so that the engine can operate at leaner than stoichiometric mixtures under all running conditions without deteriorating engine performance.

In order to insure optimum engine performance, good fuel economy and smooth running, it is desirable that all components of the engine and all running characteristics be adjusted for a particular type of optimum fuel which is used in the engine. However, frequently the optimum fuel may not be available or may not be used and performance can become degraded unless some corrective measure is taken.

For example, if an engine is designed to run on fuel of a certain octane and a lower octane fuel is substituted, poor performance and knocking can occur. Many engine control systems include an arrangement which sense a knocking condition and in response to that condition retard the spark timing to reduce the likelihood of knocking. At the same time, these systems generally enrich the air/fuel mixture so as to further insure against a knocking condition. However, when this is done fuel consumption will significantly increase and exhaust emission control may deteriorate.

It is, therefore, a still further object to this invention to provide an improved arrangement for adjusting the running condition of an engine when a knocking condition is detected so as to preclude knocking without increasing fuel consumption.

SUMMARY OF THE INVENTION

Certain features of the invention are adapted to be embodied in an internal combustion engine having at least one combustion chamber, an induction system for delivering at least an air charge to the combustion chamber and a charge forming system for delivering at least a fuel charge to the combustion chamber. Boost means are also provided for boosting the pressure of the air charge supplied to the combustion chamber by the induction system.

In accordance with a first feature of the invention relating to an engine of the type described in the preceding paragraph, means are provided for sensing the engine running condition and control means maintain a lean air/fuel ratio under substantially all running conditions and vary the pressure supplied by the boost means for providing the desired torque without necessitating enrichment of the air/fuel mixture.

Another feature of the invention is adapted to be embodied in a method of operating an engine of the type described. In accordance with this method, the engine running conditions are sensed and when the engine running conditions call for an increase in power to maintain the torque curve, the boost pressure supplied by the boost means is increased without enriching the air/fuel mixture.

Another feature of the invention is adapted to be embodied in a spark ignited, internal combustion engine having ignition means for igniting a charge in a combustion chamber of the engine and a charge forming system for delivering a air/fuel charge to the combustion chamber for combustion therein. In accordance with this facet of the invention, when a knocking condition is sensed in the engine the spark advance is retarded and the air/fuel ratio is shifted to the lean side.

DETAILED DESCRIPTION OF THE PREFERRED EMBODIMENTS OF THE INVENTION

Figure 1:
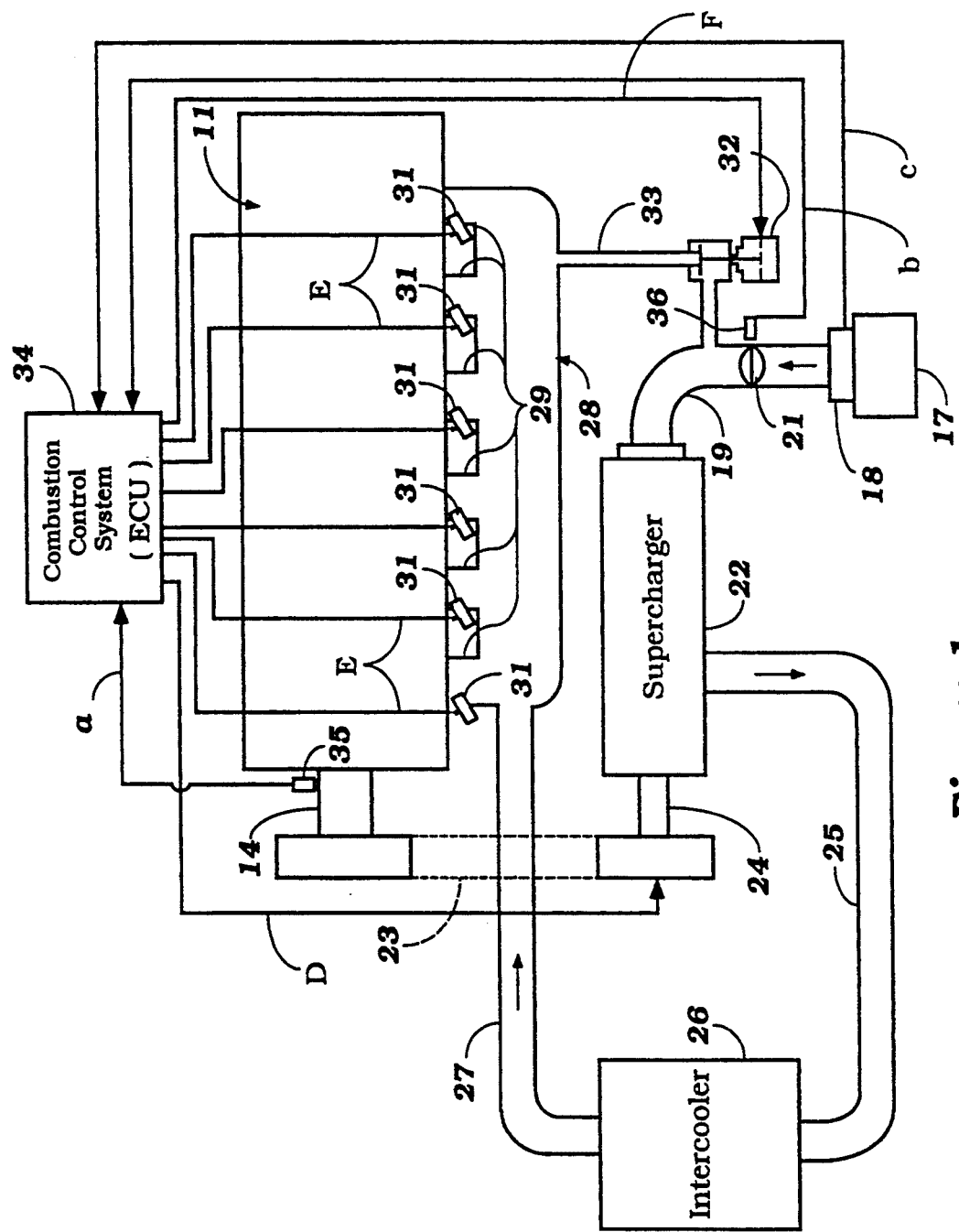
FIG. 1 is a partially schematic top plan view of an internal combustion engine constructed and operated in accordance with an embodiment of the invention.
Figure 2:
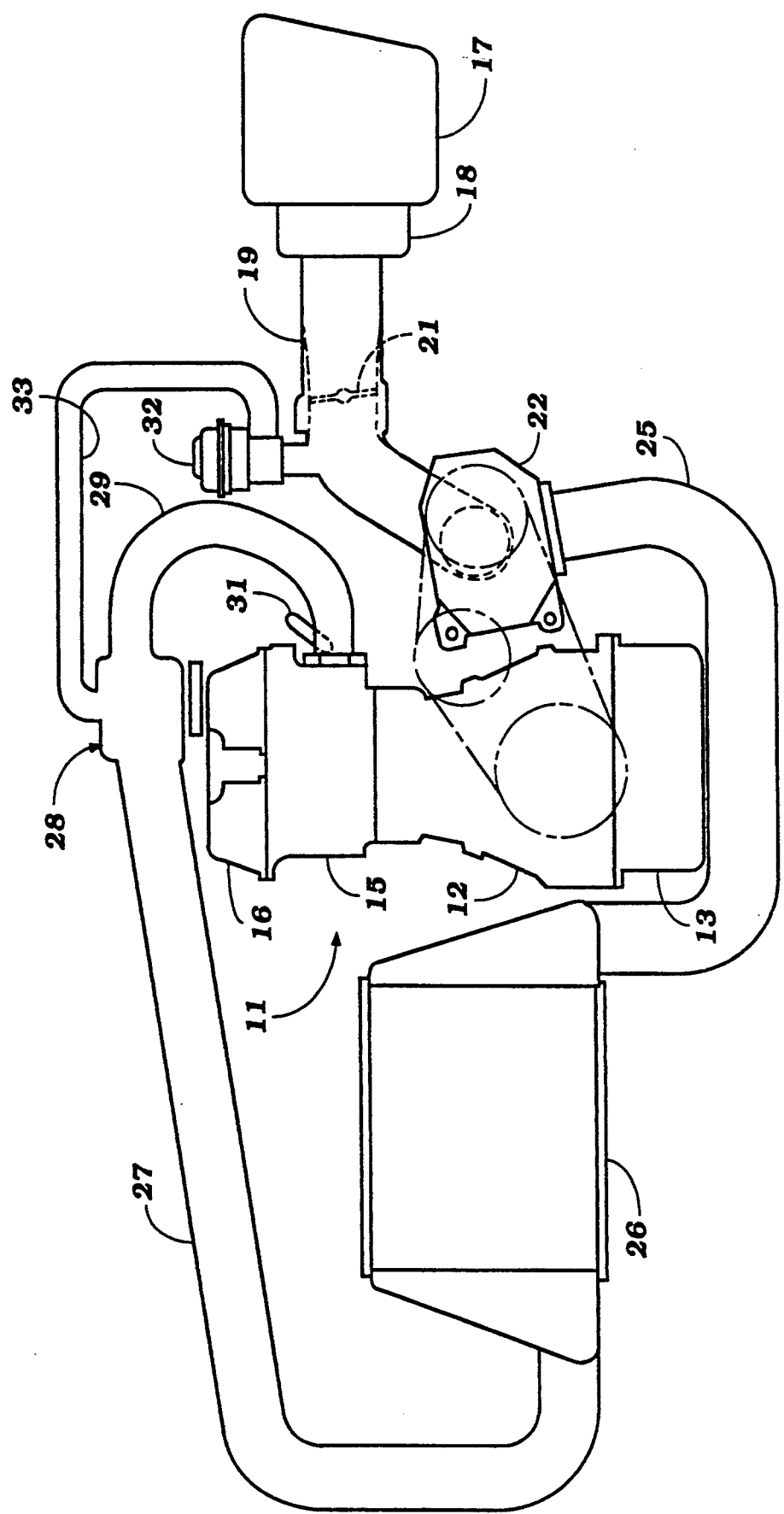
FIG. 2 is a front elevational view of the engine.

Referring now in detail to the drawings and initially to FIGS. 1 and 2, a six cylinder, in-line, four cycle, internal combustion engine constructed and operated in accordance an embodiment of the invention is identified generally by the reference numeral 11. Although the invention is described in conjunction with an engine having this cylinder number and configuration and operating on the four stroke principle, it is to be understood that certain facets of the invention may be employed with engines having other cylinder numbers, other cylinder types and engines operating on the two stroke principle as well as the four stroke principle. In addition, the invention or at least certain facets of it are also usable with rotary type engines.

Since the invention deals primarily with the induction and charge forming system for the engine and the way the engine is controlled and since the internal components of the engine may be of any conventional type, no cross sectional views of the engine 11 are believed to be necessary to understand the invention.

Basically, the engine includes a cylinder block 12 in which the cylinders are formed and which is supported above a crankcase 13 that rotatably journals a crankshaft 14 and which contains a supply of lubricant for the engine 11. A cylinder head 15 is affixed to the cylinder block 12 in a known manner and, in the illustrated embodiment, the engine 11 is of the overhead camshaft type and includes a cam cover 16 mounted at the top of the cylinder head 15 that contains a pair of overhead mounted camshafts for operating the intake and exhaust valves of the engine in any well known manner.

An induction system is provided for delivering an atmospheric air charge to the cylinders of the engine 11 and this includes an air inlet device 17 which draws atmospheric air and passes through it a filter element (if desired) and may incorporate anyknown type of internal silencing system. The air then passes through an air flow meter 18, which may of any known type, into an inlet pipe 19 in which a flow controlling throttle valve 21 is rotatably positioned. The throttle valve 21 is connected in any appropriate manner to a remote throttle control mechanism.

The air charge is then delivered to an air compressor or supercharger 22, which in the illustrated embodiment is of the screw type. It is to be understood that the invention may be employed with any type of supercharger such as positive displacement or centrifugal type superchargers in addition to the screw type described, or may in fact be employed with exhaust turbine driven superchargers (turbochargers). The term "supercharger" is used in the specification generically to cover all such devices.

A supercharger drive arrangement 23 is provided for driving an input shaft 24 of the supercharger 22 from the engine crankshaft 14. The drive arrangement 23 may include either a variable speed drive, a clutch, or any combination thereof, for reasons which will become apparent.

The supercharger 22 discharges the compressed air charge into a conduit 25 which, in turn, delivers the compressed air charge to an intercooler 26 of any known type. The cooled compressed air charge then flows through a duct 27 to an intake manifold 28. The intake manifold 28 has individual runners 29 that deliver the compressed air charge to the cylinders of the engine 11 through the porting arrangement provided in the cylinder head 15.

An air/fuel charge former is provided for supplying a combustible mixture to these combustion chambers and this charge forming system, in the illustrated embodiment, includes individual fuel injectors 31 of the port type which inject the fuel charge into the manifold runners 29 where they meet the cylinder head 15. Of course, the invention may be used with other types of charge forming systems, as will be readily apparent to those skilled in the art.

The charge which is delivered to the cylinders of the engine 11 in the manner thus far described, is ignited by spark plugs (not shown) through a suitable ignition system, which will be described later. The burnt charge is then exhausted through an exhaust system (not shown) and discharged to the atmosphere in any well known manner.

As has been previously noted, the supercharger drive 23 either includes a variable speed mechanism and/or clutch so that the supercharger 22 may be driven to provide the desired degree of boost for a given engine condition. In addition, the boost pressure is controlled by a by-pass control valve 32 positioned in a by-pass line 33 that extends from the manifold 28 back to the induction conduit 19 upstream of the supercharger 22.

The engine 11 is provided with a combustion control system show schematically in FIG. 1, and indicated by the reference numeral 34 which operates to control (1) the timing and duration of fuel supply from the fuel injectors 31 to control the air/fuel ratio, (2) the supercharger drive 23, (3) by-pass valve 32 (to control the boost pressure) and (4) the timing and firing of the spark plugs of the engine. This combustion control system 34 may be of any known type of computer or ECU and receives certain signals indicative of engine operating conditions such as a signal "a", indicative of engine crankshaft rotational speed, from a crankshaft rotation sensor 35, a signal "b", representative of position of the throttle valve 21, as sensed by a throttle valve position sensor 36 and a signal "c", indicative of air flow, as sensed from the air flow sensor 18. In addition to these engine operating conditions, the ECU 34 may receive various other signals indicative of ambient or engine running conditions.

The ECU 34 outputs a signal "D" to the supercharger drive 23 so as to control either/and/or the drive ratio between the crankshaft 14 and the supercharger drive shaft 24 and the engagement or disengagement of aforementioned clutch for discontinuing the drive completely. In addition, there is output a signal E to the fuel injector 31 for controlling the air/fuel ratio and timing of fuel delivery and a signal "F" to the by-pass valve 32 for further control of the boost pressure generated by the supercharger 22. In addition, a signal is provided to the spark plugs for the engine 11 for controlling the timing of firing of the spark plugs associated with each cylinder.

The control strategy employed by the ECU 34 is such so as to maintain a leaner than stoichiometric mixture ratio under all running conditions. With gasoline type fuel, the stoichiometric ratio is something in the order of about 14½ to 1 and the control system is designed so as to maintain an air/fuel ratio in the range of about 16 to 18 to 1 to operate in the economical air/fuel ratio range and less than stoichiometric. Any of the known types of devices may be incorporated in the engine 11 so as to insure the initiation of combustion when the spark plugs are fired such as turbulence increasing devices or the like. Unlike conventional lean burn engines, however, when the engine 11 is operated under a transient increasing load or high load condition, the air/fuel ratio is still maintained at a leaner than stoichiometric ratio. The increased power and improved torque is achieved by increasing the boost pressure generated by the supercharger 22.

Figure 3:
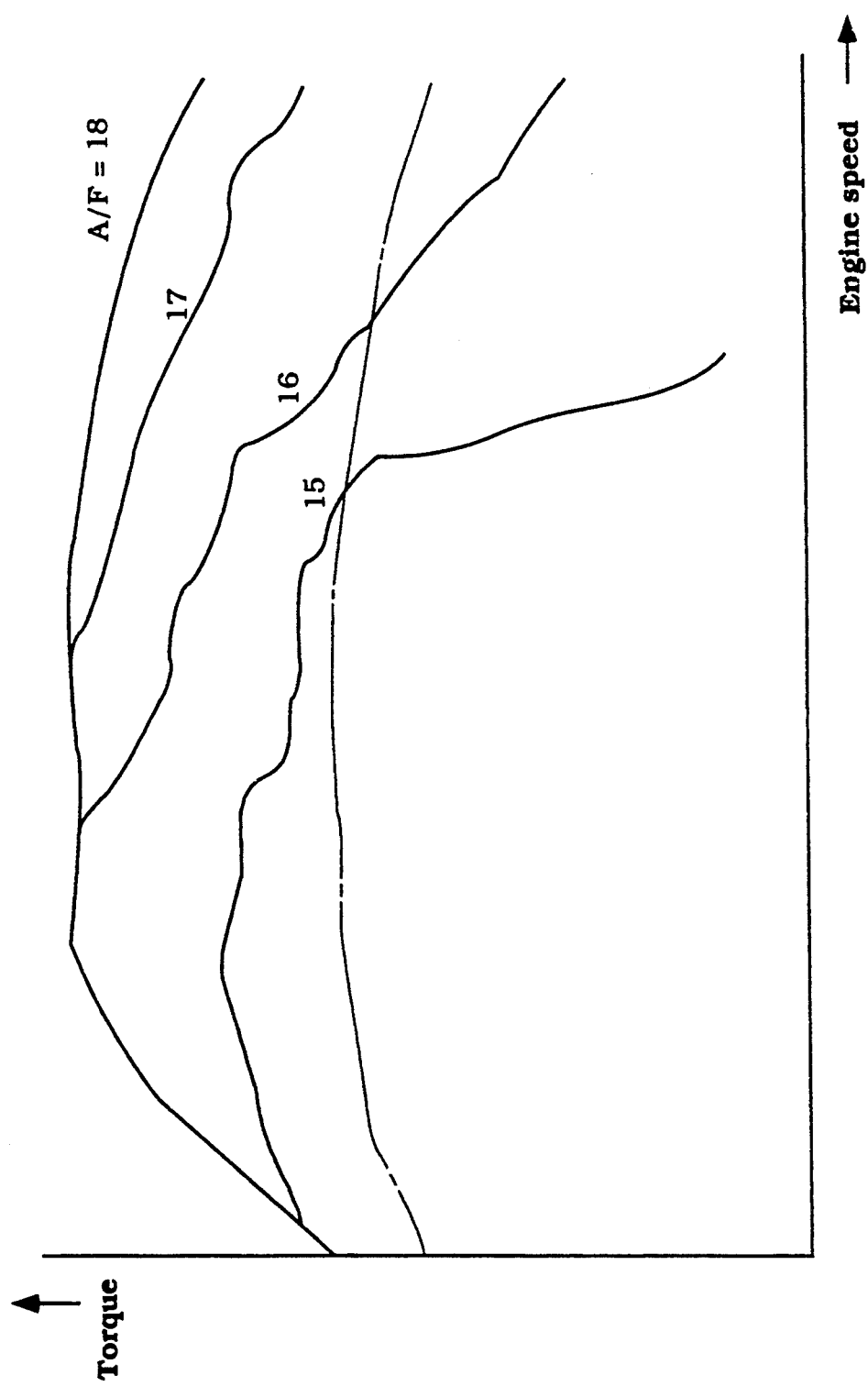
FIG. 3 is a graphically view showing a family of torque, engine speed curves for lean burn running conditions.
Figure 4:
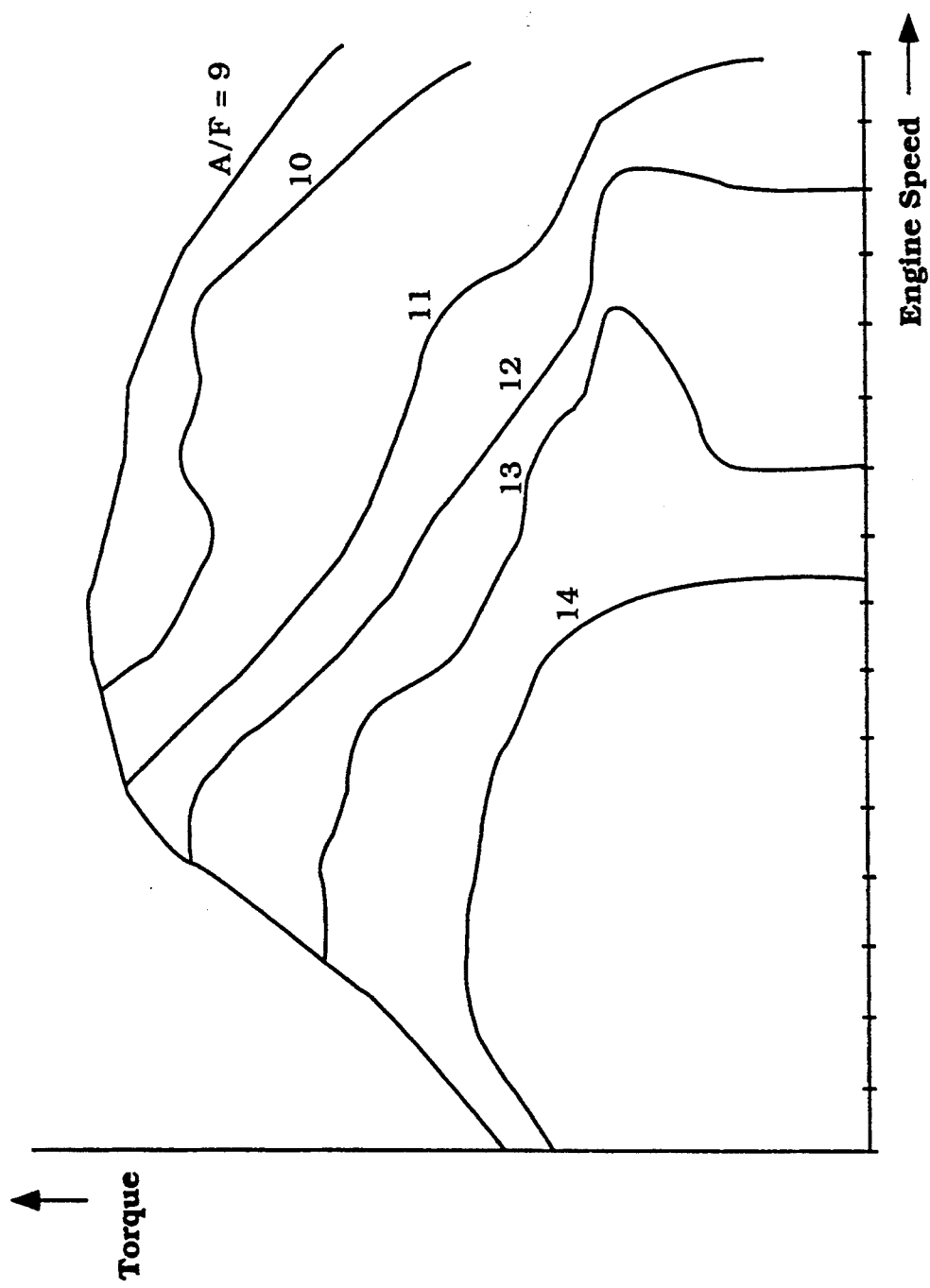
FIG. 4 is a graphically view, in part similar to FIG. 3, showing a family of torque, speed curves for stoichiometric and richer air/fuel running conditions.
Figure 5:
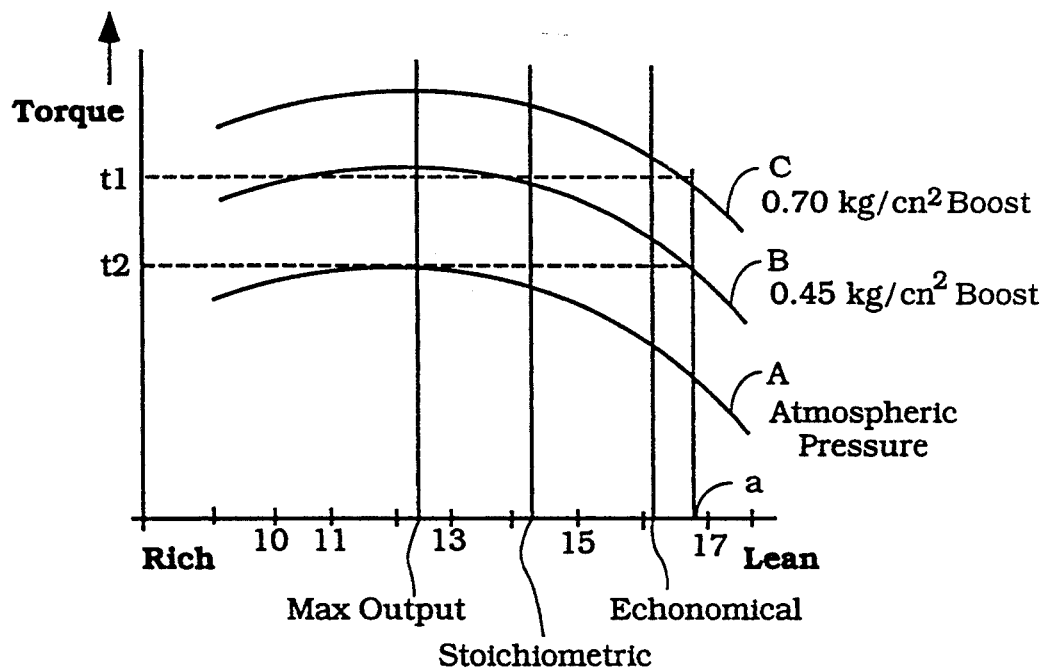
FIG. 5 is a graphically view showing torque and air/fuel ratio curves to explain how the engine is operated to maintain the desired torque curve without necessitating a rich air/fuel mixture.

This control strategy may be best understood by reference to FIGS. 3 through 5. FIG. 3 shows a family of engine speeds versus torque curves for engines operating in the stoichiometric or rich range. It may be seen that as the engine speed increases, the air/fuel ratio is decreased to provide a richer mixture and more output torque and power. This can result in a very rich air/fuel ratio of about 9 at the high end of the engine load. With this invention, however, the air/fuel ratio is maintained leaner than stoichiometric at all times by increasing the boost pressure to achieve the desired torque curve as show in FIG. 3.

The manner in which this is done may be understood by reference to FIG. 5 which shows a series of torque, speed curves to air/fuel ratio curves at different induction system pressures. In FIG. 5, there are three torque to air/fuel ratio curves illustrated A, B and C which represent atmospheric pressure (no boost), 0.45 Ka/cm² boost and 0.70 Ka/cm² boost. A conventional supercharged rich burn engine will deliver a torque t1 at a stoichiometric mixture. If this is the desired torque at a given engine running condition, the ECU 34 operates the control for the supercharger drive 23 and the by-pass valve 32 so as to maintain a boost pressure of 0.70 Ka/cm² at an air/fuel ratio of about 16.8 to 1 and can achieve the same torque t1 as if the engine were operated on a rich burn with a lower boost pressure. Said another way, the necessary torque can be achieved without increasing the air/fuel ratio toward the rich side merely by increasing the boost pressure.

In this way, the torque curve desired for the engine can be generated while maintaining a leaner than stoichiometric air/fuel ratio under all running conditions. Thus, good fuel economy may be maintained and also excellent exhaust emission control can also be maintained. With conventional engines employing superchargers that are driven intermittently, there is a shock due to the abrupt increase of torque when the supercharger drive is initiated. However, with this invention since the engine is always operated in a lean burn state, the torque increase at the start of supercharger operation is less and such shocks can be reduced.

As has been previously noted, the invention may also be employed with turbocharged engines. The use of a direct driven supercharger rather than a turbocharger has certain advantages, but the principal may also be employed with turbocharged engines. The supercharger has the advantage that it does not have the variation in exhaust gas energy to drive the turbine as would occur with a turbocharged engine which is particularly important in conjunction with lean burn engine operation. In addition, the increase of back pressure with turbocharged engines is reduced and therefore burning fluxuation rate can be reduced through the use of a supercharger rather than a turbocharger. Also, the use of a turbocharger can cause rises in exhaust gas temperature and this has obvious disadvantages. As noted above, however, the invention can be employed with turbocharged as well as engine driven superchargers and the term "supercharger" as used in the specification and claims is intended to be generic to both engine driven superchargers and exhaust driven superchargers (turbochargers).

Another important feature of the control for the engine 11 involves the way in which knocking is prevented without necessitating rich air/fuel mixtures. In a conventional engine, if a knocking condition is sensed and it occurs for a predetermined time period, it may be assumed that the engine is operating on a lower than design for octane fuel and it is the conventional practice to avoid knocking by retarding the spark. At the same time, engine protection is initiated to enrichen the air/fuel mixture and this can give rise to excess fuel consumption. This condition exists both with conventional normally aspirated engines and supercharged engines having knock control.

Figure 6:
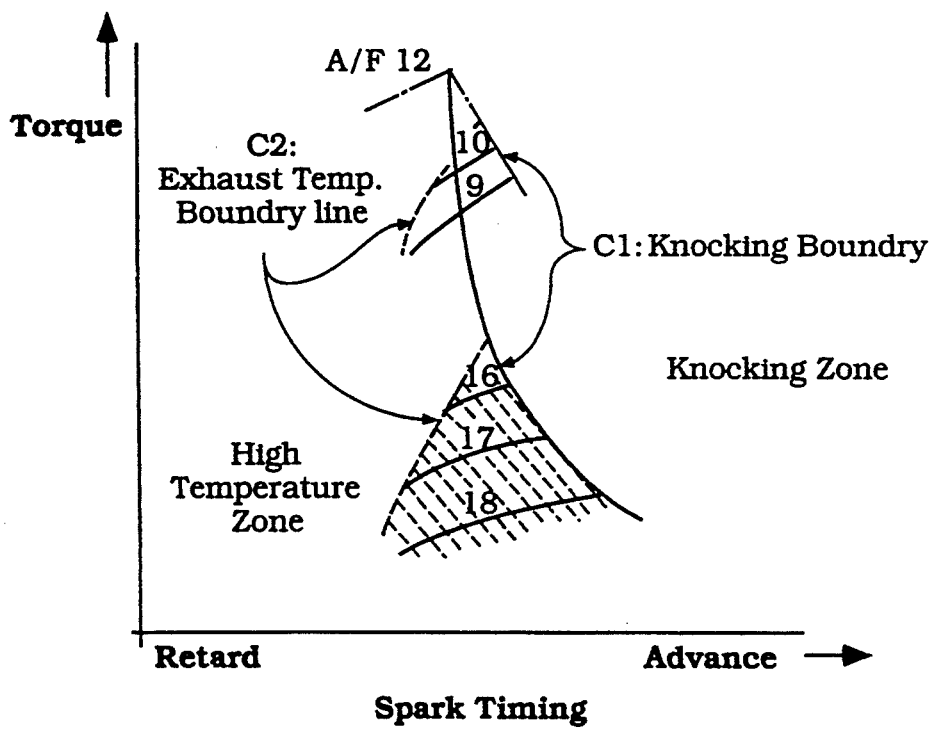
FIG. 6 is a graphically view showing torque versus spark timing and how knocking is prevented.
Figure 7:
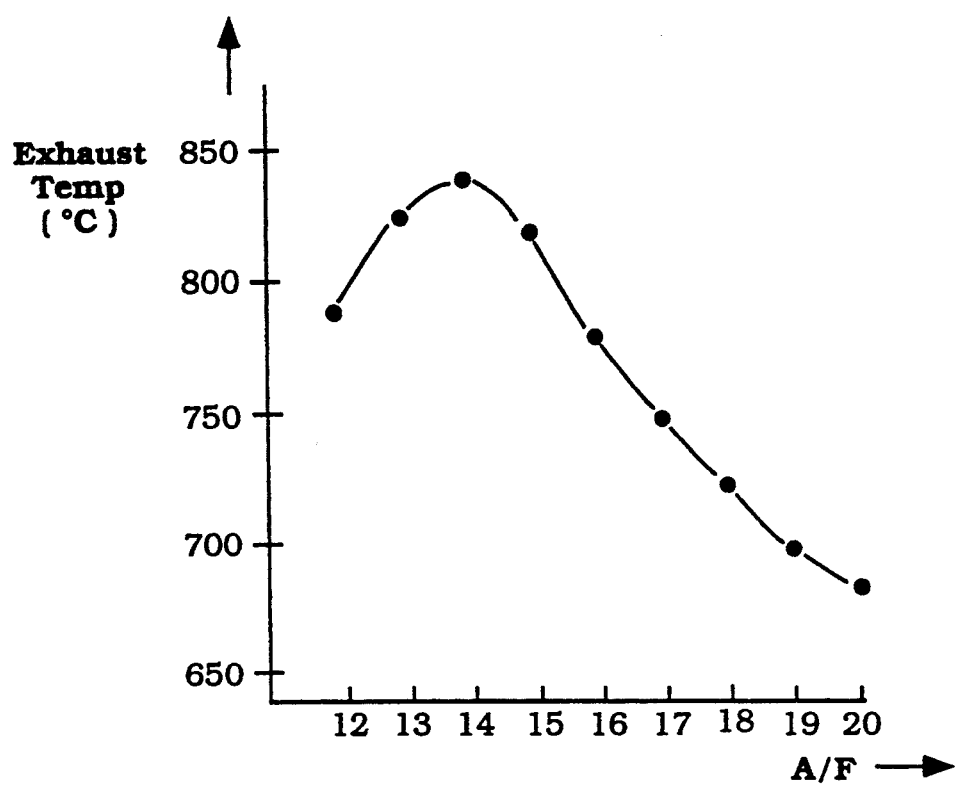
FIG. 7 is a graphically showing exhaust gas temperature in relation to air/fuel ratio.
Figure 8:
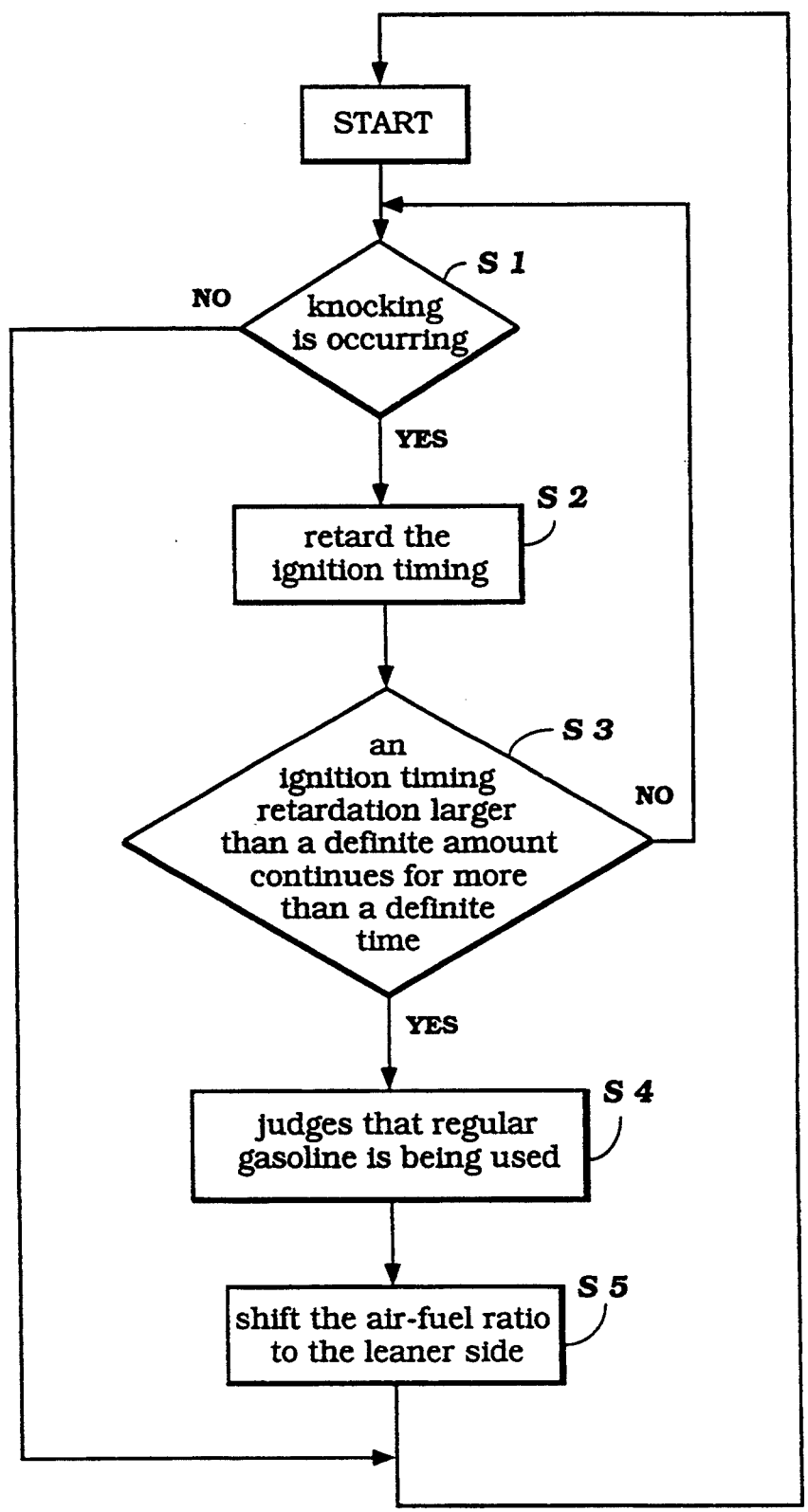
FIG. 8 is a block diagram showing a control routine for preventing knocking without necessitating enrichment of the air/fuel mixture.

In accordance with another important feature of the invention, the ECU 34 incorporates an arrangement whereby when the spark advance is retarded to avoid knocking, knocking is further reduced by provided a leaning in the air/fuel ratio. As may be seen in FIGS. 6 and 7, the knocking boundary is reduced as the air/fuel ratio is decreased. FIG. 7 shows how the exhaust gas temperature can be easily reduced by providing a leaner air/fuel mixture. For example, an exhaust gas temperature which may approach 850° C. at stoichiometric mixture can be easily dropped to 700° C. by operating at an air/fuel ratio of 19 to 1. Hence, in accordance with the invention when a knocking condition is sensed, both ignition timing is retarded and the mixture is made leaner than previous to the knocking condition in accordance with a control routine as shown in FIG. 8.

The program starts and then moves to the step S1 to determine by means of a knock sensor or any known method if knocking is occurring. If it is not, the program repeats.

If, however, knocking is sensed at the step S1, then the ignition timing is retarded in accordance with any desired routine at the step S2. The program then moves to the step S3 to determine if ignition timing has been retarded for more than a pre-determined time period. For example, this can be a time such as the matter of three seconds or longer. In the event the retardation has been longer than that time period, the program then moves to the step S4 to determine that a lower quantity gasoline is being used and this is the reason knocking has occurred. The program then moves to the step S5 so as to shift the air/fuel ratio slightly toward the leaner side and then the program repeats. It is to be understood that this control routine can be utilized not only in conjunction with the supercharged, lean burn engine described previously but also with conventional lean burn engine techniques or even with engines running on a stoichiometric ratio.

The foregoing description is that of preferred embodiments of the invention and various changes and modifications may be made without departing from the spirit and scope of the invention, as defined by the appended claims.

We claim:

1. An internal combustion engine having at least one combustion chamber, an induction system for delivering at least an air charge to said combustion chamber, a charge forming system for delivering at least a fuel charge to said combustion chamber, boost means for boosting the pressure of said air charge supplied to said combustion chamber by said induction system, means for sensing engine running conditions, and a control for said charge forming system and said boost means for maintaining a leaner than stoichiometric air/fuel ratio under all running conditions and for varying the pressure supplied by said boost means for producing the desired torque without necessitating enrichment of the air/fuel ratio so that the torque is varied primarily by varying the boost pressure.

2. An internal combustion engine as set forth in claim 1 wherein the leaner than stoichiometric air/fuel ratio is an air/fuel ratio of 16 to 1 or greater.

3. An internal combustion engine as set forth in claim 1 wherein the boost means comprises a supercharger.

4. An internal combustion engine as set forth in claim 3 wherein the supercharger is engine driven.

5. An internal combustion engine as set forth in claim 3 wherein the boost pressure of the supercharger is varied by varying the driving of the supercharger from the engine.

6. An internal combustion engine as set forth in claim 3 wherein the boost pressure is varied by varying the speed at which the supercharger is driven.

7. An internal combustion engine as set forth in claim 1 further including means for detecting knocking of the engine and means for retarding the timing of spark ignition when a knocking condition is sensed.

8. An internal combustion engine as set forth in claim 7 further including means for leaning the air/fuel ratio in response to sensing of a knocking condition.

9. An internal combustion engine as set forth in claim 8 wherein the air/fuel ratio is not leaned unless knocking occurs for longer than a pre-determined time period.

10. An internal combustion engine as set forth in claim 9 wherein the lean air/fuel ratio is an air/fuel ratio of 16 to 1 or greater.

11. An internal combustion engine as set forth in claim 9 wherein the boost means comprises a supercharger.

12. An internal combustion engine as set forth in claim 11 wherein the supercharger is engine driven.

13. An internal combustion engine as set forth in claim 12 wherein the boost pressure of the supercharger is varied by varying the driving of the supercharger from the engine.

14. An internal combustion engine as set forth in claim 11 wherein the boost pressure is varied by varying the speed at which the supercharger is driven.

15. An internal combustion engine as set forth in claim 1 wherein the charge forming system comprised a fuel injector for injecting fuel for the combustion chamber.

16. A method of operating an internal combustion engine having at least one combustion chamber, an induction system for delivering at least an air charge to said combustion chamber, a charge forming system for delivering at least a fuel charge to said combustion chamber, boost means for boosting the pressure of said air charge supplied to said combustion chamber by said induction system, and means for sensing engine running conditions, comprising the steps of maintaining a leaner than stoichiometric air/fuel ratio under all running conditions and varying the pressure supplied by said boost means for producing the desired torque without necessitating enrichment of the air/fuel ratio so that the torque is varied primarily by varying the boost pressure.

17. A method of operating an internal combustion engine as set forth in claim 16 wherein the leaner than stoichiometric air/fuel ratio is an air/fuel ratio of 16 to 1 or greater.

18. A method of operating an internal combustion engine as set forth in claim 16 further including detecting knocking of the engine and retarding the timing of spark ignition when a knocking condition is sensed.

19. A method of operating an internal combustion engine as set forth in claim 18 further including leaning the air/fuel ratio in response to sensing of a knocking condition.

20. A method of operating an internal combustion engine as set forth in claim 19 wherein the air/fuel ratio is not leaned unless knocking occurs for longer than a pre-determined time period.

21. A method of operating an internal combustion engine as set forth in claim 20 wherein the leaner than stoichiometric air/fuel ratio is an air/fuel ratio of 16 to 1 or greater.

* * * * *